(12) United States Patent
Morrow et al.

(10) Patent No.: US 8,137,476 B2
(45) Date of Patent: Mar. 20, 2012

(54) SECONDARY REACTION QUENCH DEVICE AND METHOD OF USE

(75) Inventors: Duane Morrow, College Station, TX (US); Joel Cantrell, College Station, TX (US); Edward R. Peterson, Pearland, TX (US)

(73) Assignee: Synfuels International, Inc., Dallas, TX (US)

( * ) Notice: Subject to any disclaimer, the term of this patent is extended or adjusted under 35 U.S.C. 154(b) by 453 days.

(21) Appl. No.: 12/419,025

(22) Filed: Apr. 6, 2009

(65) Prior Publication Data

US 2010/0252072 A1 Oct. 7, 2010

(51) Int. Cl.
*B08B 7/00* (2006.01)
(52) U.S. Cl. ............ 134/39; 134/22.18; 134/26; 134/34
(58) Field of Classification Search .................. None
See application file for complete search history.

(56) References Cited

U.S. PATENT DOCUMENTS

| | | | |
|---|---|---|---|
| 3,365,387 A | 1/1968 | Cahn et al. | |
| 3,557,241 A | 1/1971 | Kivlen et al. | |
| 3,920,537 A | 11/1975 | Walker | |
| 4,127,473 A | 11/1978 | Hozuma et al. | |
| 4,196,050 A | 4/1980 | Takahashi et al. | |
| 4,203,778 A | 5/1980 | Nunciato et al. | |
| 4,224,108 A | 9/1980 | Takahashi et al. | |
| 4,243,633 A | 1/1981 | Hozuma et al. | |
| 4,297,147 A | 10/1981 | Nunciato et al. | |
| 4,376,694 A | 3/1983 | Lohr et al. | |
| 4,611,613 A | 9/1986 | Kaplan | |
| 4,626,320 A | 12/1986 | Alworth et al. | |
| 4,673,442 A | 6/1987 | Kaplan | |
| 4,849,025 A | 7/1989 | Bain et al. | |
| 4,917,787 A | 4/1990 | Fukuhara et al. | |
| 5,944,961 A | 8/1999 | Gandman | |

FOREIGN PATENT DOCUMENTS

| | | |
|---|---|---|
| JP | 06322373 A | 11/1994 |
| JP | 10130651 A | 3/1998 |

OTHER PUBLICATIONS

International Search Report, International Application No. PCT/US2009/039783, Dated Apr. 26, 2010, 6 pages.

*Primary Examiner* — Michael Kornakov
*Assistant Examiner* — Eric Golightly
(74) *Attorney, Agent, or Firm* — Timothy S. Westby; Porter Hedges LLP

(57) ABSTRACT

In this disclosure, a reactor system is described. The reaction system comprises (a) a reaction vessel having an inner wall, wherein said reaction vessel is configured to receive reactants and export products and byproducts; (b) a primary quench device (PQD) configured to receive a coolant and disperse said coolant into said reaction vessel; and (c) a secondary quench device (SQD) configured to receive a coolant and disperse said coolant into said reaction vessel; wherein said PQD comprises an array of spray nozzles fixed on the inner wall of said reaction vessel at a first axial position; and wherein said SQD comprises (1) an axially movable pipe having a coolant entry end and a nozzle end, wherein said pipe is configured to be removably fixed inside said reaction vessel; and (2) a spray nozzle that is fluidly connected to said pipe at its nozzle end via a fluid tight seal connection.

13 Claims, 3 Drawing Sheets

SECONDARY REACTION QUENCH DEVICE AND METHOD OF USE

BACKGROUND

1. Technical Field of the Invention

This invention relates generally to the removal of carbon deposits in various reactors. More specifically, this invention relates to an apparatus and a method for carbon removal (or carbon ablation), which is deposited on the inner wall surfaces of reactors wherein thermal reactions take place.

2. Background of the Invention

Carbon deposits are commonly seen in reactors, especially those utilizing hydrocarbons or fuels to generate thermal energy. For example, when a stream of incompletely burned atomized fuel droplets reaches the wall of a combustor in a gas turbine engine, a localized reducing atmosphere is created. This enables carbon deposits to form on the combustor wall. Periodic breaking off of pieces of these carbon deposits can result in significant erosion damage to the combustor in the gas turbine engine.

Another case is the production of acetylene, wherein natural gas is reacted at high temperatures to produce acetylene. These high temperatures can be produced through the reaction of a fuel, such as syngas and oxidant such as oxygen. The production of acetylene, when in high enough concentration can lead to formation of carbon-containing solids in the thermal reactor in the section downstream of the hydrocarbon gas inlet. The carbon-containing solids can accumulate on the internal walls of the thermal reactor and impede flow through the reactor, resulting in increased differential pressure and/or space velocity. In some cases wherein the reacting gases pass through a restriction in the reactor, accumulation of carbon deposits in this region can impede the reaction or even stop the reaction because no flow is allowed to pass through.

Some reactors are equipped with carbon deposit removal apparatus. But when the reactor operates at temperatures above which the materials of the removal apparatus are subject to mechanical or structural degradation, the apparatus cannot remain in the reaction zone of the reactor.

U.S. Pat. No. 4,243,633 discloses a closed reactor for the thermal cracking of heavy oils, having an internally mounted, rotatable injection pipe. The injection pipe is adapted to spurt preheated raw material under pressure against the inner wall surfaces of the reactor while rotating to remove carbon which has deposited on the reactor walls during the previous cracking operation. The injection pipe is inserted into the reactor through a top opening in the reactor. The injection pipe has two axially extended portions offset from one another, one of which is located on the axis of the reactor and the other extends along an interior wall surface of the reactor at a closely spaced distance from the wall surface. The injection pipe is provided with a multitude of spouting jets longitudinally spaced along its length, each of the spouting jets is formed in the wall of said injection pipe at an angle of 25° to 90° with respect to the longitudinal axis of the injection pipe.

U.S. Pat. No. 4,224,108 discloses a carbon removal apparatus that is suitable for use on a reaction vessel for the thermal cracking of heavy petroleum oils. This apparatus essentially includes a rotatable main injection pipe to be disposed in the reaction vessel and has a multitude of jet nozzles along its length, and a second or auxiliary injection pipe positioned in the proximity of the main injection pipe to inject a scrubbing liquid over the outer peripheral walls of the main injection pipe to prevent deposition of carbon. The main and auxiliary injection pipes are both supplied with heavy petroleum oil to remove the carbon deposition from the reactor wall by the heavy petroleum oil jets from the main injection pipe while wetting the exterior of the main pipe with the heavy petroleum oil injected by the auxiliary injection pipe.

U.S. Pat. No. 4,127,473 discloses a method for the batch thermal cracking of heavy oils, such as steam blowing for production of binder pitch. The method employs a reactor having a rotary injection pipe which is rotatable within the reactor. Upon completion of the thermal cracking and withdrawal of the reaction product, the injection pipe ejects preheated raw material under pressure against the interior wall surfaces of the reactor while in rotation to remove carbon which has deposited on the reactor walls during the previous cracking operation.

U.S. Pat. No. 4,917,787 utilizes a reactor with an insulator. Insulators are physically weak materials compared to metals and are subject to ablation, erosion, cracking and other physically degenerative mechanisms when exposed to flowing gases, flowing gases that contain solids, liquid sprays, liquid sprays that contain solids, and other flowing media. In addition, insulators generally have porous surfaces compared to metals onto which carbon deposits can attach and intrude into, making removal of said carbon deposits difficult or impossible without abrading or otherwise damaging the insulating surface and insulator integrity.

U.S. Pat. Nos. 3,557,241 and 3,365,387 disclose the introduction of sufficient steam and/or water to at least one tube of the cracking furnace while simultaneously reducing the hydrocarbon feed to that tube. The tube is then put back into service. The treatment of the tube is effected at temperatures ranging from as low as 370° C. (700° F.) to about 1100° C. (2000° F.). Such heat is supplied by external firing of the reactor tubes. Both Patents utilize a separate and distinct feed line for introducing steam and/or water for the on-stream carbon removal procedure. These lines are controlled by a valve which is put into service on only those occasions when the individual tube in question being subjected to carbon removal is undergoing such a cleaning operation.

U.S. Pat. No. 3,920,537 deals with the carbon deposition evolving from hydrocarbon cracking operations by "periodically contacting the carbon deposit with a jet of relatively cold, high-pressure water." The Patent describes jetting the high-pressure cold water against the carbon deposit in an amount sufficient to thermally shock and break up the carbon deposit, typically at a pressure in excess of about 5000 pounds per square inch. This type of carbon removal technique, however, is only particularly useful where the carbon deposition occurs on surfaces having temperatures of approximately 370° C. (700° F.) to 538° C. (1,000° F.).

U.S. Pat. No. 4,203,778 effects carbon removal of furnace tubes by the use of a turbulent stream of impact resistant, non-angular, non-abrasive particles entrained in a gas stream. The particles are entrained at a concentration of 0.1 to 1.0 pound per pound of gas and the gas is introduced into the inlet end of the furnace tubes at a gas flow rate corresponding to an inlet velocity of 14,000 to 20,000 feet per minute.

Generally speaking, the prior art carbon removal procedures in the hydrocarbon cracking field, operate under certain process constraints. The prior art utilizes carbon removal procedures wherein the reactors are made of metal. These processes are operated at reaction temperatures not exceeding about 1100° C. Because the reactors are made of metal, the heat for the carbon removal reactors is transferred through the walls. They usually require taking the reaction train equipment out of service and specially treating that equipment so as to reduce or eliminate the coking problem. Furthermore, in most cases, these processes require the dismantling of equipment or the addition of equipment in order to effect carbon removal. Such procedures are exceedingly time consuming, and add materially to the cost of the operation of the hydrocarbon cracking apparatus.

U.S. Pat. No. 4,849,025 uses an oxidant to oxidize the carbon and uses a liquid to take carbon away. Using an oxidant in this manner is a departure from normal operating conditions under which the reaction is meant to proceed. Changing the contents or stoichiometry in the reactor reduces conversion to the desired product and often the product is not collected during this non-production stage. Also, changing operating conditions of the reaction results in non-normal control states; thus non-normal function required for process control devices such as control valves, flow meters, temperature indicators, pressure indicators and similar devices, complicates process control and the return to normal operating conditions.

A mechanical apparatus to physically dislodge or scrub carbon particles has been employed in some reactors. U.S. Pat. No. 4,196,050 (1980) of Takahashi et al. describes a rotatable injection pipe for introduction of a scrubbing liquid with means for reciprocating motion.

U.S. Pat. No. 4,673,442 uses a physically reaming device to remove a bed of carbon from vessels used to produce carbon. Use of physical devices to remove carbon deposits imparts shear and normal stress to the carbon that are imparted to the reaction vessel which can damage or weaken the vessel, reducing its useful life. In addition, such devices can directly deform, crack, or otherwise damage the surface when the device directly impacts the reactor vessel surface.

U.S. Pat. No. 4,626,320 utilizes hydro-blast drilling to remove petroleum carbon from delayed coking drums. Use of hydroblast drilling is disadvantageous because of the damage that very-high-velocity spray can have on reactor internals and components.

U.S. Pat. No. 4,297,147 utilizes abrasive particles added to gas at high gas velocity for carbon removal. Use of abrasive particles leads to erosion of metal surfaces and reduces the useful lifetime of reaction vessels due to the scoring action that abrasive particles have at high velocities. Also, high velocity particles tend to cause greater damage at bends, angles, corners and other direct or glancing impact locations.

Several methods for internal cleaning or carbon removal of hydrocarbon furnace tubes are currently employed, the most common of which are mechanical cleaning (commonly known as turbining), hydroblasting, and stream-air carbon removal.

Turbining essentially consists of cutting or reaming the carbon deposits from the tube wall by passing a cutting head through each straight section. This method requires that the furnace be disassembled to the extent that the inlet and outlet of each individual straight section of tube is exposed to allow entry of the cutting head. For those furnaces of welded return bend design this means that return bends must be initially cut off and welded back in place after cleaning. Commercial sandblasting is usually employed to clean the return bends. This method has several major drawbacks, including: (1) that it results in substantial downtime; (2) it is labor intensive; (3) it results in substantial tube wall wear and subsequent premature tube failure as a result of improper alignment of cutting head and furnace tube; and (4) it causes severe erosion of return bends.

The second technique, known as hydroblasting, is similar to turbining except that, instead of the cutting tool, a hydraulic device is inserted into each tube. The device produces high pressure water jets directed normal to the tube wall which dislodge the deposit by impact. Again, this method results in substantial downtime and is labor intensive for the same reasons mentioned above. Furthermore, the high pressure water tends to dissolve sulfur initially deposited on the tube wall and results in possible sulfuric acid corrosion of the tubes in addition to creating a significant waste disposal problem.

Both of the above processes require that the furnace be cooled to near atmospheric temperature. Not only does this result in significant additional downtime, but in certain furnaces the cool down process itself can result in destruction of the furnace tubes. It is not uncommon during cool down for a furnace tube to fracture longitudinally as a result of differential thermal contraction. The heavy inner layer of carbon has a significantly lower thermal expansion coefficient compared to typical tubing material and can result in circumferential thermal stresses in the tube wall in excess of its ultimate tensile strength.

Probably the most common method of carbon removal furnace tubes is by injecting metered amounts of steam and air into the tubes with the furnace fired. The solid carbon is thus removed by a highly exothermic reaction between the solid carbon and air which generates a gas-solid stream of carbon particulate, $CO$, $CO_2$, $SO_2$ and $NO_x$. The stream is used to cool the products of reaction. Process steps include: (1) removing the furnace from hydrocarbon service; (2) connecting carbon removal lines to the furnace; and (3) introducing steam and air to induce controlled burn out. Though furnace downtime is considerably less than for the above two processes, this steam-air process can result in serious and costly furnace damage. During the process, the tube skin temperature must be maintained within very narrow limits so as to both sustain the temperature required to support the reaction and yet limit the reaction temperature below the tube melting point. This highly exothermic reaction frequently results in ruptured tubes and fittings and hence costly downtime. In addition, the high temperature reaction of oxygen can leave an oxide layer on the inner tube wall which will inhibit heat transfer. Mechanical cleaning or polishing must be used to remove the deposits subsequent to steam-air carbon removal operations. Finally, a further disadvantage of this process is that the effluent gases are highly toxic and thus create serious environmental problems, if not properly handled.

Therefore, there is continuing need and interest to develop apparatus and methods for removal of carbon deposits in various reactors.

SUMMARY

In an embodiment, a reactor system is disclosed. The reaction system comprises (a) a reaction vessel having an inner wall, wherein said reaction vessel is configured to receive reactants and export products and byproducts; (b) a primary quench device (PQD) configured to receive a coolant and disperse said coolant into said reaction vessel; and (c) a secondary quench device (SQD) configured to receive a coolant and disperse said coolant into said reaction vessel; wherein said PQD comprises an array of spray nozzles fixed on the inner wall of said reaction vessel at a first axial position; and wherein said SQD comprises (1) an axially movable pipe having a coolant entry end and a nozzle end, wherein said pipe is configured to be removably fixed inside said reaction vessel; and (2) a spray nozzle that is fluidly connected to said pipe at its nozzle end via a fluid tight seal connection.

In some embodiments, the spray nozzle of the SQD of the reactor system is able to move upstream and downstream in the reaction vessel with respect to the first axial position of the PQD. In some embodiments, the spray nozzle of the SQD of the reactor system is configured to disperse the coolant onto the inner wall of the reaction vessel in the upstream direction at a spray angle of from 0° (radial direction) to 90° (axial direction). In some embodiments, the spray nozzle of the SQD of the reactor system is configured to disperse the coolant onto the inner wall of the reaction vessel in the upstream direction at a spray angle of from 0° to 70°.

In some embodiments, the reactor system further comprises an aligning means and a stabilizing means, both of which are configured to regulate the movement of the axially movable pipe of the SQD. In some embodiments, the reactor system further comprises a separation system configured to receive the byproducts from the reaction vessel. In some embodiments, the reactor system further comprises a cooling system.

In another embodiment, a method to remove carbon deposits is described. The method comprises (a) providing a reaction vessel having an inner wall, wherein said reaction vessel is configured to receive reactants and export products and byproducts; (b) reacting said reactants to form said products and byproducts, wherein said byproducts comprise carbon, at least a portion of which becomes deposited on the inner wall of said reaction vessel; (c) providing a primary quench device (PQD) configured to receive a fluid and disperse said fluid into said reaction vessel, wherein said PQD comprises an array of spray nozzles fixed on the inner wall of said reaction vessel at a first axial position; (d) providing a secondary quench device (SQD) configured to receive a fluid and disperse said fluid into said reaction vessel, wherein said SQD comprises (1) an axially movable pipe having a coolant entry end and a nozzle end, wherein said pipe is configured to be removably fixed inside said reaction vessel; and (2) a spray nozzle that is fluidly connected to said pipe at its nozzle end via a fluid tight seal connection; (e) introducing a first coolant to the array of nozzles of said PQD at a first flow rate and dispersing said first coolant through said array of nozzles of the PQD to quench the reaction of said reactants in said reaction vessel; (f) introducing a second coolant to the pipe of said SQD at a second flow rate; and (g) dispersing the second coolant through the spray nozzle of said SQD onto the inner wall of said reaction vessel in the upstream direction to remove carbon deposits or to quench the reaction of said reactants or to accomplish both.

In some embodiments, steps (f) and (g) take place while the axially movable pipe of the SQD is moving inside the reaction vessel. In some embodiments, steps (f) and (g) take place while step (b) is taking place in the reaction vessel. In some embodiments, step (f) takes place at a sufficient second flow rate before the axially movable pipe moves upstream in the reaction vessel beyond the first axial position of the PQD.

In some embodiments, the first flow rate is regulated to maintain the temperature of the mixture of reactants in a desired range. In some embodiments, the movement of the movable pipe of the SQD, the first and second flow rates are regulated to maintain the temperature of the mixture of reactants in desired ranges. In some embodiments, the first coolant and the second coolant are the same or different. In some embodiments, the first coolant or the second coolant is selected from the group consisting of water, oil, an inorganic solvent, an organic solvent, a solvent derived from hydrocarbons, and combinations thereof.

In some embodiments, the duration for steps (f) and (g) to be in operation is more than 10% of the duration for step (e) to be in operation. In some embodiments, the duration for steps (f) and (g) to be in operation is between 0% and 100% of the duration for step (e) to be in operation. In some embodiments, the duration for steps (f) and (g) to be in operation is between 50% and 100% of the duration for step (e) to be in operation.

In some embodiments, the duration for steps (f) and (g) to be in operation is less than 50% of the duration that step (b) is taking place in the reaction vessel. In some embodiments, the duration for steps (f) and (g) to be in operation is less than 10% of the duration that step (b) is taking place in the reaction vessel. In some embodiments, the duration for steps (f) and (g) to be in operation is between 0.1% and 1% of the duration that step (b) is taking place in the reaction vessel.

In some embodiments, the method to remove carbon deposits further comprises (h) collecting coolant with removed carbon deposits contained therein from said reaction vessel; (i) separating said coolant from said removed carbon deposits; (j) cooling the separated coolant to a desired temperature range; and (k) recycling the cooled coolant to be reused in step (e) or step (f) or both. In embodiments, separating in step (i) comprises centrifugation and filtration.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more detailed description of the preferred embodiments of the present invention, reference will now be made to the accompanying drawings.

DETAILED DESCRIPTION

Figure 1:
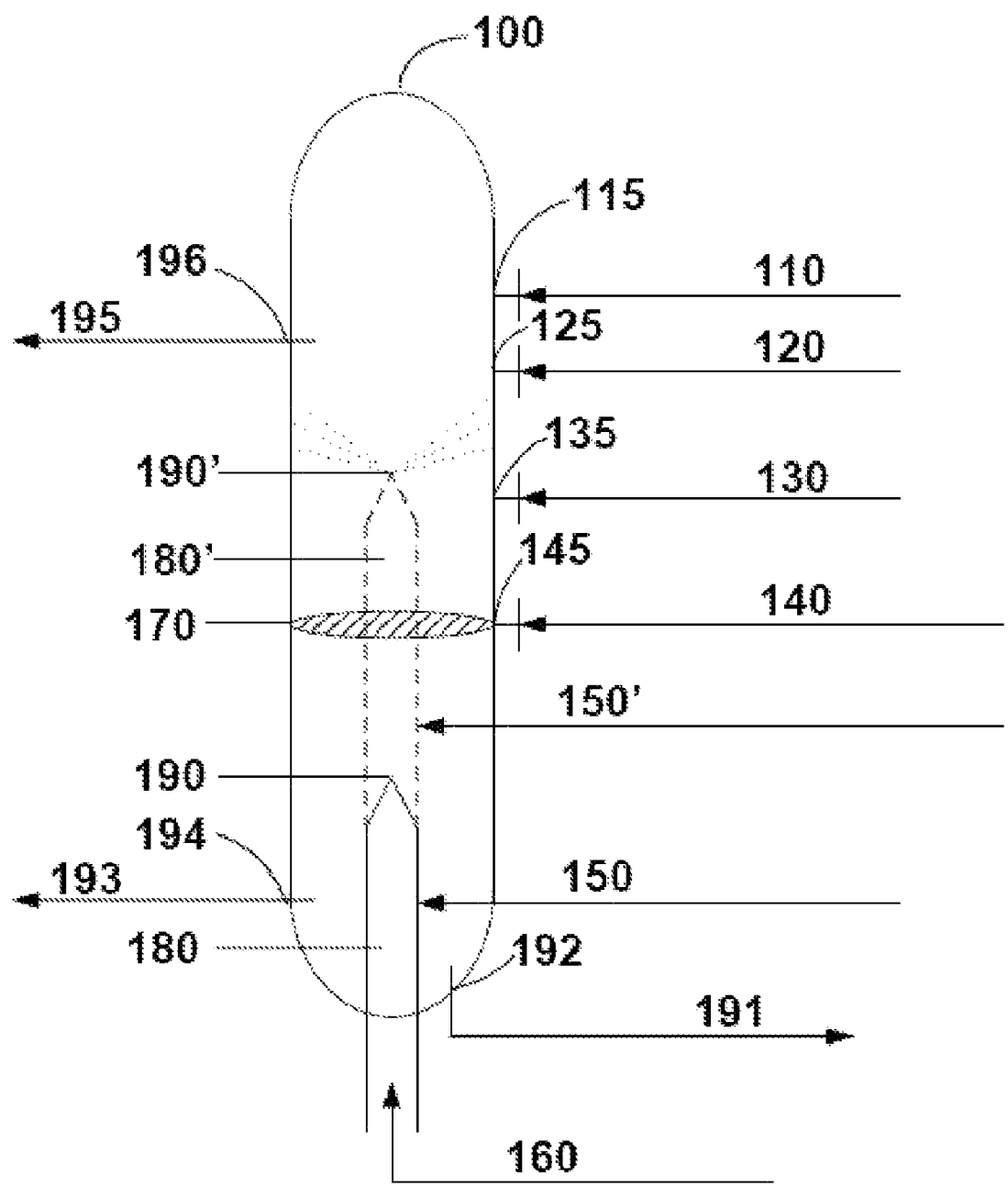
FIG. 1 schematically illustrates a thermal reactor with a primary quench device and a secondary quench device for carbon deposit removal in accordance with an embodiment of this disclosure.

Herein will be described in detail specific preferred embodiments of the present invention, with the understanding that the present disclosure is to be considered an exemplification of the principles of the invention and is not intended to limit the invention to that illustrated and described herein. The present invention is susceptible to preferred embodiments of different forms or order and should not be interpreted to be limited to the specifically expressed methods or apparatus contained herein.

Overview

In an embodiment, a secondary quench device (SQD) is provided for carbon deposit removal (CDR) for a reaction vessel. In embodiments, the SQD is removably fixed/attached inside a reaction vessel. In an embodiment, a method for CDR is described utilizing a SQD that is furnished to a reaction vessel. In embodiments, CDR takes place while the reaction vessel is being operated under normal conditions. In embodiments, the method of CDR prevents on-line SQD from being damaged even though the normal operating conditions in the reaction/combustion zone of the reaction vessel are severe enough to cause such damage.

Reaction Vessels

In embodiments, reaction vessels include combustors, turbines, engines, rocket motors, furnaces, tubular reactors, kilns, ovens, and any other suitable reaction vessel known to one skilled in the art. Generally speaking, any vessel that is utilized to generate thermal energy by burning fuels is contemplated in this disclosure. Suitable fuels include syngas, hydrocarbons, alcohols, carbon dioxide, ammonia, particulate carbon, and any chemical or compound that contains carbon element and generates thermal energy when combined with an oxidant, such as oxygen, air, chlorine, bromine, other element or compound that acts as an oxidizer relative to the fuel at conditions under which a reaction takes place. This disclosure does not intend to differentiate these reaction vessels by their type, shape, size, material of make, method of use, or operation conditions.

Reaction Zones

In embodiments, reaction vessels comprise one or more reaction zones or combustion zones. In some embodiments, the reaction zones in a reaction vessel are separated by a physical structure, which includes an insulator, a metal plate, a matrix, a bed, and any structure that is known to one skilled in the art. In some embodiments, the reaction zones in a reaction vessel are separated by a thermal barrier, whether physical or non-physical. For example, one reaction zone of a reaction vessel is operated at a first temperature; another reaction zone of the same vessel is operated at a second temperature that is 100° C. below the first temperature. In some embodiments, the reaction zones in a reaction vessel are defined by a landmark for ease of reference. For example, two reaction zones may be defined as one above an inlet for introduction of a substance and the other below the inlet. In some embodiments, the reaction zones in a reaction vessel are defined by an action in operation for ease of reference. For example, two reaction zones may be defined as one in which introduction of a substance takes place first and the other in which such introduction takes place second in sequence. Generally speaking, a reaction zone may be defined by physical separations, operating conditions, operational regimes, or simply for ease of reference.

Primary Quench Device (PQD)

In an embodiment, a reaction vessel is equipped with a primary quench device (PQD) which is in thermal communication with the reaction vessel either directly or indirectly (e.g., through a physical thermal barrier). In some cases, the PQD is a cooling jacket encasing at least a portion of the reaction vessel. In some cases, the PQD comprises an array of spraying nozzles that introduce a coolant into the reaction vessel. In some cases, the PQD is integrated into the reaction vessel wall to cool down the temperature of the vessel wall. In some embodiments, the PQD is movable. In some embodiments, the PQD is immovable. In some embodiments, the PQD is removably fixed inside the reaction vessel. In embodiments, the quenching capacity of the PQD is adjustable according to operational needs. The adjustment of the PQD is any suitable means known to one skilled in the art for each PQD configuration.

Secondary Quench Device (SQD)

In an embodiment, a reaction vessel is furnished with a secondary quench device (SQD) which is in thermal communication with the reaction vessel either directly or indirectly (e.g., through a physical thermal barrier). In some cases, the SQD is a cooling jacket encasing at least a portion of the reaction vessel. In some cases, the SQD comprises an array of spraying nozzles that introduce a coolant into the reaction vessel. In some cases, the SQD is integrated into the reaction vessel wall to cool down the temperature of the vessel wall. In some embodiments, the SQD is movable. In some embodiments, the SQD is immovable. In some embodiments, the SQD is removably fixed inside the reaction vessel. In embodiments, the quenching capacity of the SQD is adjustable according to operational needs. The adjustment of the SQD is any suitable means known to one skilled in the art for each SQD configuration. In certain embodiments, SQD not only acts to remove carbon deposits but also provides a desired level of quenching/cooling for the reaction mixture.

PQD and SQD are defined mainly for ease of reference and not meant to be differentiated by their quenching capacity, installation procedure, operation sequence, functional ability, or operational effects. As one of ordinary skill in the art would understand, the concept of a SQD can be easily expanded to include additional quench device; therefore the inclusion of any additional quench device for CDR is within the scope of this disclosure. In some embodiments, PQD, SQD, and any additional quench device are coordinated to provide variable quenching effects for the thermal reactor, which adjusts the composition of the products obtained. In some embodiments, PQD, SQD, and any additional quench device are coordinated to separate a thermal reactor into different reaction zones, which are maintained at different reaction temperatures. In some cases, the temperatures of the reaction zones are maintained by the adjustment of PQD, SQD, and any additional quench device.

Configuration 1

Referring now to FIG. 1, in an embodiment, a thermal reactor (100) is equipped with a PQD 170 and a SQD comprising a pipe 180 and a spray nozzle 190 for CDR. Thermal reactor 100 has a fuel inlet 115 for fuel stream 110 and an oxidant inlet 125 for oxidant stream 120. Gas stream 130 for thermal treatment is introduced into reactor 100 via inlet 135. Coolant stream 140 is introduced to the PQD 170 via inlet 145. In an embodiment, PQD 170 is an array of spray nozzles fixed on the periphery of the inner wall of thermal reactor 100. In embodiments, the positions of inlets 115-145 are chosen according to the desired effects of combustion, thermal treatment, and quenching.

Thermal reactor has at least one outlet for products and byproducts formed during reactions to be extracted. The byproducts include carbon, at least a portion of which becomes deposited on the inner wall of the reactor. In FIG. 1, gaseous products are extracted via outlet 196 as stream 195; liquid products are extracted via outlet 194 as stream 193; and coolant with removed carbon deposits contained therein is extracted via outlet 192 as stream 191.

In an embodiment, pipe 180 and spray nozzle 190 of the SQD are fluidly connected via a fluid tight seal connection. Coolant stream 160 is introduced into pipe 180 and when the SQD is in operation, the coolant is dispersed into thermal reactor 100 via spray nozzle 190. In the embodiment shown in FIG. 1, pipe 180 together with nozzle 190 is directed upward into thermal reactor 100 from the bottom of the reactor. In other embodiments, different configurations are contemplated as long as these configurations enable desired CDR function.

In some embodiments, the position of pipe 180 together with nozzle 190 in the reactor is axially adjustable or movable, which adjustment/movement may take place manually, mechanically, or automatically. For example, position 150 shows a base position for the SQD and position 150' shows an extended position for the SQD with dashed lines showing the pipe (180') and the nozzle (190'). In some embodiments, axial adjustment/movement for the SQD takes place during the operation of the reactor. The axially adjustable pipe is further equipped with aligning and stabilizing mechanisms so that the axially adjustable pipe stays within the intended radial position of the thermal reactor. In some embodiments, the adjustment/movement of the SQD is done smoothly in one step. In some embodiments, the adjustment/movement of the SQD is done smoothly in multiple steps. In some embodiments, the adjustment/movement of the SQD is done smoothly and sporadically in discrete steps to satisfy specific CDR needs.

In embodiments, nozzle 190 is designed to allow the coolant to be sprayed radially or at an angle between radial and axial directions onto the inner wall of thermal reactor 100. The spray angle of nozzle 190 of the SQD is defined as 0° at the radial direction and 90° at the axial direction. In some embodiments, the spray angle varies between 0°-90° in the upstream direction. In some embodiments, the spray angle varies between 0°-70° in the upstream direction. In some embodiments, the spray angle varies between 0°-90° in the downstream direction. In some embodiments, the spray angle varies between 0°-70° in the downstream direction. In certain embodiments, the spray angle varies between 0°-90° in both the upstream and downstream directions. In embodiments, axial movement of pipe 180 and spray action of nozzle 190 may take place simultaneously so that coolant is sprayed onto the desired surfaces of the inner wall of the thermal reactor for CDR. Exterior to the reactor, pipe 180 is connected by a hose to a pressurized source of fluid coolant (not shown in FIG. 1) so that fluid coolant may be directed through the axially adjustable pipe and the nozzle as needed.

Operation 1

Referring to FIG. 1, the oxidation reaction (combustion) between fuel (stream 110) and oxidant (stream 120) in thermal reactor 100 raises the temperature of the mixture to a range of from about 2000° C. to about 3500° C. When gas stream 130 (e.g., hydrocarbon-containing gases) encounters this hot mixture, pyrolysis takes place, forming gas products comprising acetylene, ethylene, carbon monoxide, hydrogen, carbon dioxide, water vapor, propadiene, methylacetylene, and smaller amounts of other hydrocarbons and organic molecules. This product gas mixture has a temperature in the range of from about 1700° C. and to about 3000° C.

This product gas mixture is then quenched by PQD 170 using the coolant (stream 140) provided. Suitable coolants include water, oil, an inorganic solvent, an organic solvent, a solvent derived from hydrocarbons, and combinations thereof. Any fluid that does not react with the products of the thermal reactor may be used as a coolant. The product gas or gas-liquid mixture that passes through the PQD generally has a temperature in the range of from about 100° C. to about 1000° C.

In embodiments, SQD comprising pipe 180 and nozzle 190 is activated when CDR is desired. SQD moves axially to allow the spray of coolant to come in contact with the carbon deposits on the inner wall of the reactor, removing some or all of the carbon deposits. Suitable coolants include water, oil, an inorganic solvent, an organic solvent, a solvent derived from hydrocarbons, and combinations thereof. Any fluid that does not react with the products of the thermal reactor may be used as a coolant. Carbon deposits form mainly upstream of the PQD on the inner wall of the thermal reactor. The spray angle of nozzle 190 and movement of pipe 180 are adjusted to target the carbon deposits in that specific area. Even when the spray nozzle is below the PQD, the coolant spray is still able to reach the inner wall of the reactor that is above the PQD.

In embodiments, the flow rate of coolant in the PQD is adjusted to provide a desired level of cooling/quenching. In embodiments, the flow rate of coolant in the PQD is adjusted to maintain the temperature of the reaction mixture within a desired range. In embodiments, the flow rate of coolant in the SQD is adjusted to provide a desired level of CDR. In some embodiments, when not in operation, SQD comprising pipe 180 and nozzle 190 is fully below PQD 170 so that the SQD is protected from being damaged by the reaction mixture prior to being cooled by the PQD. The selection of material for constructing the SQD is therefore according to the highest temperature that it will encounter in a thermal reactor and may have economic advantages. In some embodiments, SQD comprising pipe 180 and nozzle 190 only moves above the PQD in the thermal reactor when coolant is flowing through the SQD at an adequate flow rate, wherein the construction material for the SQD is able to withstand the conditions of the reaction mixture; without the circulating coolant, the construction material for the SQD cannot withstand such conditions.

In some embodiments, when in operation, the SQD only moves above the PQD for a limited time in the thermal reactor. In some embodiments, prior to activating spray nozzle 190 for CDR, the coolant is circulated inside the SQD, including the axially adjustable pipe and spray nozzle. In embodiments, CDR utilizing the SQD is carried out when the thermal reactor is in operation. In embodiments, the operation of the SQD is continuous and/or semi-continuous. In embodiments, the SQD is manually or automatically operated. In some embodiments, the movement of the SQD is programmed. In some embodiments, the SQD is removably fixed inside the reactor. In some cases, the SQD stays inside the reactor whether or not it is in operation. In some cases, the SQD is fixed inside the reactor only when it is to be operated.

In some embodiments, the time that the SQD is in operation is less than 50% of the time the thermal reactor is operated. In this disclosure, a thermal reactor being operated means that reactions are taking place in the reactor unless otherwise specified. In some embodiments, the time that the SQD is in operation is less than 10% of the time the thermal reactor is operated. In some embodiments, the time that the SQD is in operation is between 0.1% and 1% of the time the thermal reactor is operated. In some embodiments, the time that the SQD is in operation is between 0% and 100% of the time the PQD is operated. In some embodiments, the time that the SQD is in operation is between 50% and 100% of the time the PQD is operated. In some embodiments, the time that the SQD is in operation is more than 10% of the time the PQD is operated. In some embodiments, the SQD is operated before an operation of the thermal reactor starts. In some embodiments, the SQD is operated after an operation of the thermal reactor ends.

Configuration 2

Figure 2:
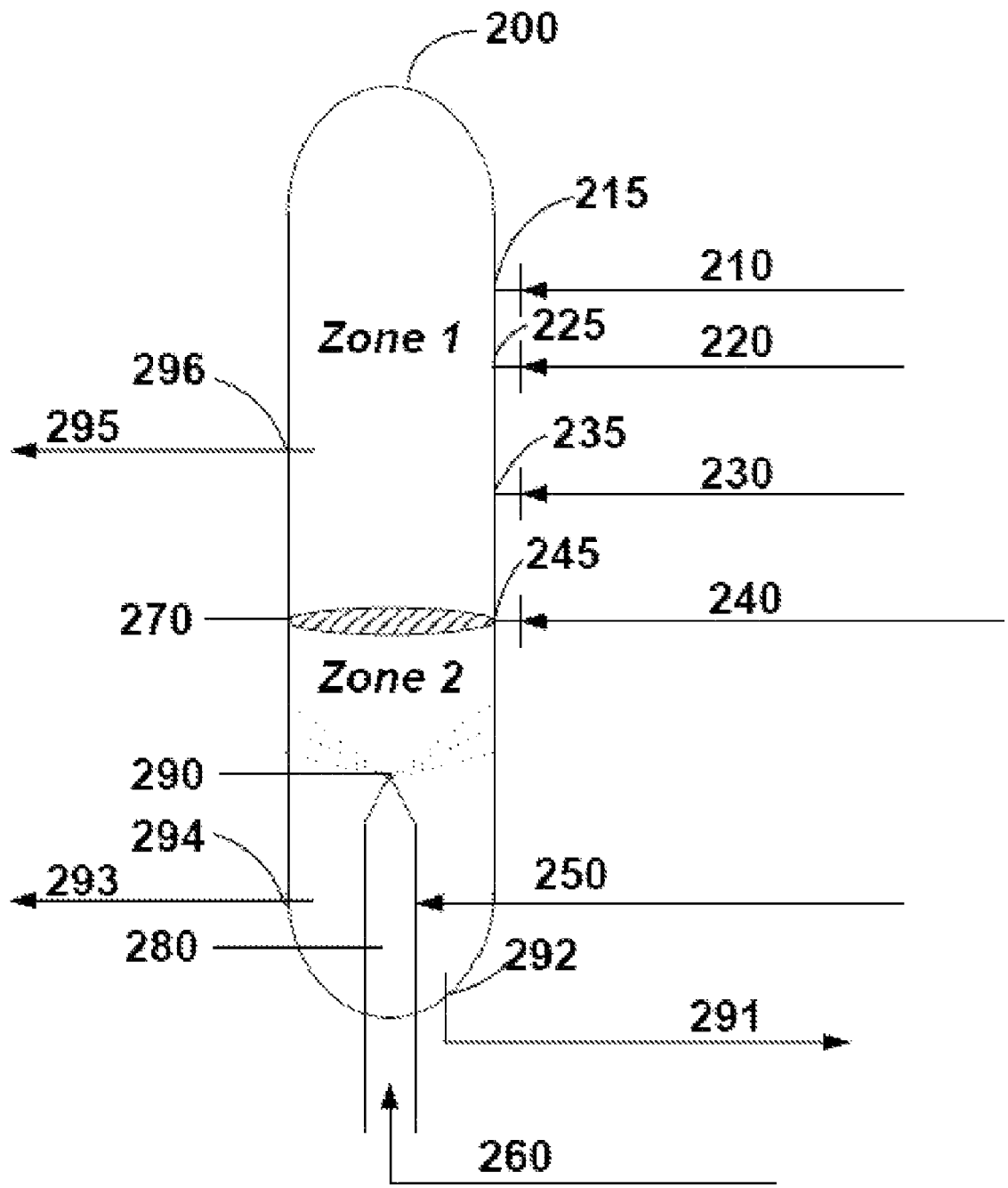
FIG. 2 schematically illustrates a thermal reactor with a primary quench device and a secondary quench device for carbon deposit removal in accordance with another embodiment of this disclosure.

Referring now to FIG. 2, in an embodiment, a thermal reactor (200) is equipped with a PQD 270 and a SQD comprising a pipe 280 and a spray nozzle 290 for CDR. Thermal reactor 200 has reaction Zone 1 above the PQD 270 and reaction Zone 2 below the PQD 270 and above the SQD. Thermal reactor 200 has a fuel inlet 215 for fuel stream 210 and an oxidant inlet 225 for oxidant stream 220. Gas stream 230 for thermal treatment is introduced into reactor 200 via inlet 235. Coolant stream 240 is introduced to the PQD 270 via inlet 245. In an embodiment, PQD 270 is an array of spray nozzles fixed on the periphery of the inner wall of thermal reactor 200. In embodiments, the positions of inlets 215-245 are chosen according to the desired effects of combustion, thermal treatment, and quenching.

Thermal reactor has at least one outlet for products and byproducts formed during reactions to be extracted. The byproducts include carbon, at least a portion of which becomes deposited on the inner wall of the reactor. In FIG. 2, gaseous products are extracted via outlet 296 as stream 295; liquid products are extracted via outlet 294 as stream 293; and coolant with removed carbon deposits contained therein is extracted via outlet 292 as stream 291.

In an embodiment, pipe 280 and spray nozzle 290 of the SQD are fluidly connected via a fluid tight seal connection. Coolant stream 260 is introduced into pipe 280 and when the SQD is in operation, the coolant is dispersed into thermal reactor 200 via spray nozzle 290. In the embodiment shown in FIG. 2, pipe 280 together with nozzle 290 is directed upward into thermal reactor 200 from the bottom of the reactor. In other embodiments, different configurations are contemplated as long as these configurations enable desired CDR function.

In some embodiments, the position of pipe 280 together with nozzle 290 in the reactor is axially adjustable or movable, which adjustment/movement may take place manually, mechanically, or automatically. Position 250 in FIG. 2 shows a possible position for the SQD comprising pipe 280 and spray nozzle 290. In some embodiments, axial adjustment/movement for the SQD takes place during the operation of the reactor. The axially adjustable pipe is further equipped with aligning and stabilizing mechanisms so that the axially adjustable pipe stays within the intended radial position of the thermal reactor. In some embodiments, the adjustment/movement of the SQD is done smoothly in one step. In some embodiments, the adjustment/movement of the SQD is done smoothly in multiple steps. In some embodiments, the adjustment/movement of the SQD is done smoothly and sporadically in discrete steps to satisfy specific CDR needs.

In embodiments, nozzle 290 is designed to allow the coolant to be sprayed radially or at an angle between radial and axial directions onto the inner wall of thermal reactor 200. The spray angle of nozzle 190 of the SQD is defined as 0° at the radial direction and 90° at the axial direction. In some embodiments, the spray angle varies between 0°-90° in the upstream direction. In some embodiments, the spray angle varies between 0°-70° in the upstream direction. In some embodiments, the spray angle varies between 0°-90° in the downstream direction. In some embodiments, the spray angle varies between 0°-70° in the downstream direction. In certain embodiments, the spray angle varies between 0°-90° in both the upstream and downstream directions. In embodiments, axial movement of pipe 280 and spray action of nozzle 290 may take place simultaneously so that coolant is sprayed onto the desired surfaces of the inner wall of the thermal reactor for CDR. Exterior to the reactor, pipe 280 is connected by a hose to a pressurized source of fluid coolant (not shown in FIG. 2) so that fluid coolant may be directed through the axially adjustable pipe and the nozzle as needed.

Operation 2

Referring to FIG. 2, the oxidation reaction (combustion) between fuel (stream 210) and oxidant (stream 220) in thermal reactor 200 raises the temperature of the mixture to a range of from about 2000° C. to 3500° C. When gas stream 230 (e.g., hydrocarbon-containing gases) encounters this hot mixture, pyrolysis takes place, forming gas products comprising acetylene, ethylene, carbon monoxide, hydrogen, carbon dioxide, water vapor, propadiene, methylacetylene, and smaller amounts of other hydrocarbons and organic molecules. This product gas mixture has a temperature in the range of from about 1700° C. and to about 3000° C.

This product gas mixture is then quenched by PQD 270 using the coolant (stream 240) provided. Suitable coolants include water, oil, an inorganic solvent, an organic solvent, a solvent derived from hydrocarbons, and combinations thereof. Any fluid that does not react with the products of the thermal reactor may be used as a coolant. The product gas or gas-liquid mixture that passes through the PQD generally has a temperature in the range of from about 100° C. to about 1000° C.

In embodiments, SQD comprising pipe 280 and nozzle 290 is activated when CDR is desired. The spray of coolant comes in contact with the carbon deposits on the inner wall of the reactor, removing some or all of the carbon deposits. Suitable coolants include water, oil, an inorganic solvent, an organic solvent, a solvent derived from hydrocarbons, and combinations thereof. Any fluid that does not react with the products of the thermal reactor may be used as a coolant. Carbon deposits form mainly upstream of the PQD on the inner wall of the thermal reactor. The spray angle of nozzle 290 and movement of pipe 280 are adjusted to target the carbon deposits in that specific area. In some embodiments, even when the spray nozzle is below the PQD, the coolant spray is still able to reach the inner wall of the reactor that is above the PQD.

In embodiments, the flow rate of coolant in the PQD is adjusted to provide a desired level of cooling/quenching. In embodiments, the flow rate of coolant in the PQD is adjusted to maintain the temperature of the reaction mixture within a desired range. For example, this desired temperature range is the temperature range for reaction Zone 1, which is a primary reaction zone. In embodiments, the flow rate of coolant in the SQD is adjusted to provide a desired level of CDR. In some embodiments, the SQD provides additional quenching/cooling to the reaction mixture after it is cooled by the PQD. In embodiments, the flow rate of coolant in the SQD is adjusted to maintain the temperature of the reaction mixture within a desired range. This desired temperature range is lower than the temperature of reaction Zone 1, which is a primary reaction zone; it may be any temperature between the maximum achievable temperature and the temperature at which all reactions cease.

In some embodiments, the PQD and SQD are coordinated to provide variable quenching effects for the thermal reactor, which adjusts the composition of the products obtained. For example, reaction Zone 1 (a primary reaction zone) may be maintained at a first temperature range and reaction Zone 2 (a secondary reaction zone) may be maintained at a second temperature range, wherein the second temperature range is lower than the first. As a result, different thermal reactions may take place in Zone 1 and Zone 2, rendering different reaction products. The temperature ranges at which Zone 1 and Zone 2 are maintained are according to the desired product compositions for each specific operation. Variable operation parameters include type of coolant, temperature of coolant, flow rate of coolant for PQD or SQD or both, moving speed of SQD, moving pattern of SQD, spray duration, spray pattern, spray angle, and spray frequency.

In some embodiments, the SQD is maintained at a position axially downstream of the PQD. This has the advantage of protecting the SQD from being damaged by the high temperature of the reaction mixture prior to being cooled by the PQD. Also, the material for constructing the SQD is selected according to the highest temperature that it will encounter in a thermal reactor and may have economic advantages. In some embodiments, prior to activating spray nozzle 290 for CDR, the coolant is circulated inside the SQD, including the axially adjustable pipe and spray nozzle. In embodiments, CDR utilizing the SQD is carried out when the thermal reactor is in operation. In embodiments, the operation of the SQD is continuous and/or semi-continuous. In embodiments, the SQD is manually or automatically operated. In some embodiments, the movement of the SQD is programmed. In some embodiments, the SQD is removably fixed inside the reactor. In some cases, the SQD stays inside the reactor whether or not it is in operation. In some cases, the SQD is fixed inside the reactor only when it is to be operated.

In some embodiments, the time that the SQD is in operation is less than 50% of the time the thermal reactor is operated. In this disclosure, a thermal reactor being operated means that reactions are taking place in the reactor unless otherwise specified. In some embodiments, the time that the SQD is in operation is less than 10% of the time the thermal reactor is operated. In some embodiments, the time that the SQD is in operation is between 0.1% and 1% of the time the thermal reactor is operated. In some embodiments, the time that the SQD is in operation is between 0% and 100% of the time the PQD is operated. In some embodiments, the time that the SQD is in operation is between 50% and 100% of the time the PQD is operated. In some embodiments, the time that the SQD is in operation is more than 10% of the time the PQD is operated. In some embodiments, the SQD is operated before an operation of the thermal reactor starts. In some embodiments, the SQD is operated after an operation of the thermal reactor ends.

Configuration 3

Figure 3:
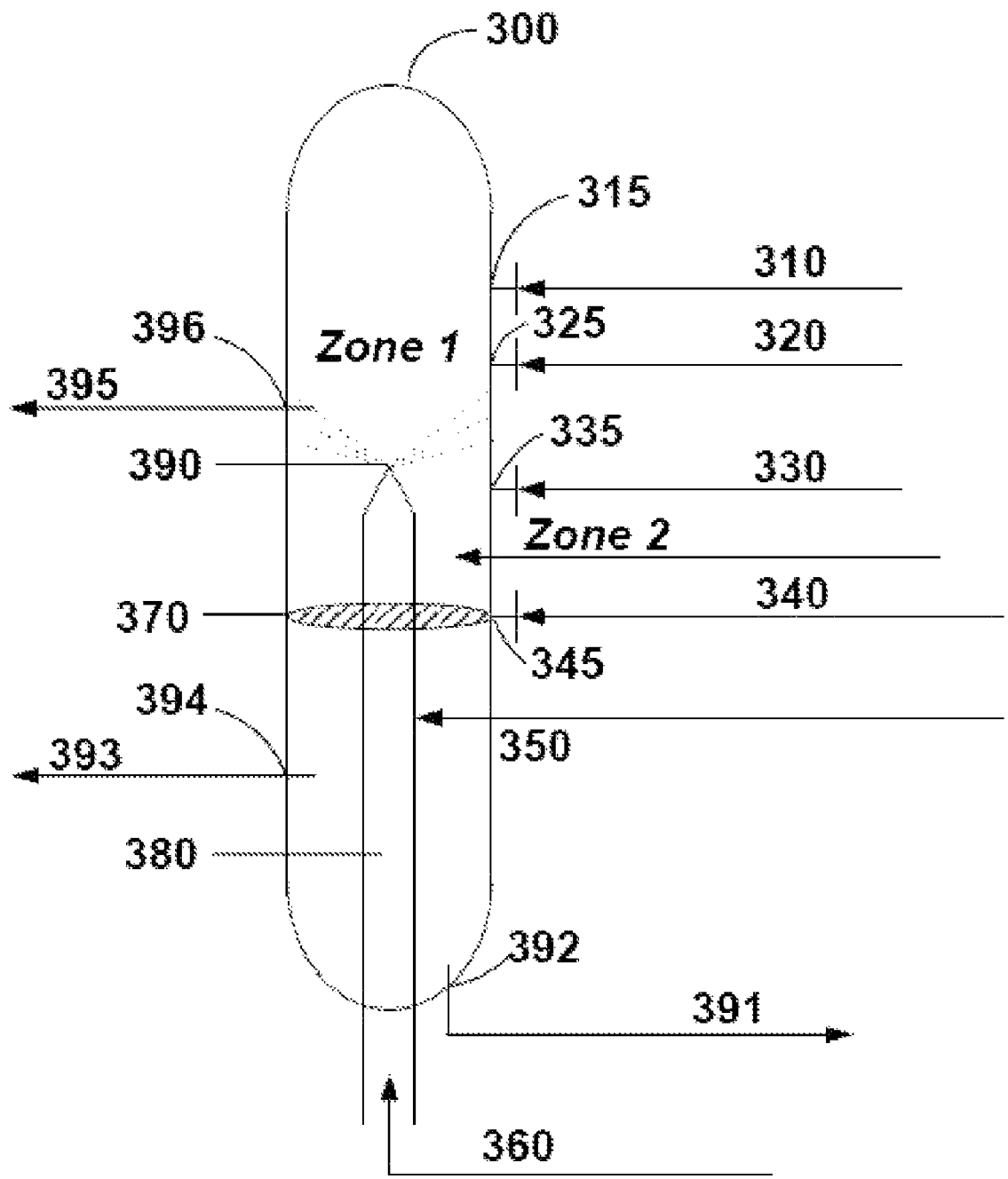
FIG. 3 schematically illustrates a thermal reactor with a primary quench device and a secondary quench device for carbon deposit removal in accordance with yet another embodiment of this disclosure.

Referring to FIG. 3, in an embodiment, a thermal reactor (300) is equipped with a PQD 370 and a SQD comprising a pipe 380 and a spray nozzle 390 for CDR. Thermal reactor 300 has reaction Zone 1 above the SQD and reaction Zone 2 below the SQD and above the PQD. Thermal reactor 300 has a fuel inlet 315 for fuel stream 310 and an oxidant inlet 325 for oxidant stream 320. Gas stream 330 for thermal treatment is introduced into reactor 300 via inlet 335. Coolant stream 340 is introduced to the PQD 370 via inlet 345. In an embodiment, PQD 370 is an array of spray nozzles fixed on the periphery of the inner wall of thermal reactor 300. In embodiments, the positions of inlets 315-345 are chosen according to the desired effects of combustion, thermal treatment, and quenching.

Thermal reactor has at least one outlet for products and byproducts formed during reactions to be extracted. The byproducts include carbon, at least a portion of which becomes deposited on the inner wall of the reactor. In FIG. 3, gaseous products are extracted via outlet 396 as stream 395; liquid products are extracted via outlet 394 as stream 393; and coolant with removed carbon deposits contained therein is extracted via outlet 392 as stream 391.

In an embodiment, pipe 380 and spray nozzle 390 of the SQD are fluidly connected via a fluid tight seal connection. Coolant stream 360 is introduced into pipe 380 and when the SQD is in operation, the coolant is dispersed into thermal reactor 300 via spray nozzle 390. In the embodiment shown in FIG. 3, pipe 380 together with nozzle 390 is directed upward into thermal reactor 300 from the bottom of the reactor. In other embodiments, different configurations are contemplated as long as these configurations enable desired CDR function.

In some embodiments, the position of pipe 380 together with nozzle 390 in the reactor is axially adjustable or movable, which adjustment/movement may take place manually, mechanically, or automatically. Position 350 in FIG. 3 shows a possible position for the SQD comprising pipe 380 and spray nozzle 390. In some embodiments, axial adjustment/movement for the SQD takes place during the operation of the reactor. The axially adjustable pipe is further equipped with aligning and stabilizing mechanisms so that the axially adjustable pipe stays within the intended radial position of the thermal reactor. In some embodiments, the adjustment/movement of the SQD is done smoothly in one step. In some embodiments, the adjustment/movement of the SQD is done smoothly in multiple steps. In some embodiments, the adjustment/movement of the SQD is done smoothly and sporadically in discrete steps to satisfy specific CDR needs.

In embodiments, nozzle 390 is designed to allow the coolant to be sprayed radially or at an angle between radial and axial directions onto the inner wall of thermal reactor 300. The spray angle of nozzle 390 of the SQD is defined as 0° at the radial direction and 90° at the axial direction. In some embodiments, the spray angle varies between 0°-90° in the upstream direction. In some embodiments, the spray angle varies between 0°-70° in the upstream direction. In some embodiments, the spray angle varies between 0°-90° in the downstream direction. In some embodiments, the spray angle varies between 0°-70° in the downstream direction. In certain embodiments, the spray angle varies between 0°-90° in both the upstream and downstream directions. In embodiments, axial movement of pipe 380 and spray action of nozzle 390 take place simultaneously so that coolant is sprayed onto the desired surfaces of the inner wall of the thermal reactor for CDR. Exterior to the reactor, pipe 380 is connected by a hose to a pressurized source of fluid coolant (not shown in FIG. 3) so that fluid coolant may be directed through the axially adjustable pipe and the nozzle as needed.

Operation 3

In embodiments, SQD comprising pipe 380 and nozzle 390 is activated when CDR is desired. The spray of coolant comes in contact with the carbon deposits on the inner wall of the reactor, removing some or all of the carbon deposits. Suitable coolants include water, oil, an inorganic solvent, an organic solvent, a solvent derived from hydrocarbons, and combinations thereof. Any fluid that does not react with the products of the thermal reactor may be used as a coolant.

In some embodiments, the SQD is maintained at a position above the PQD. The gas products at a high temperature are initially cooled/quenched by the SQD and further cooled/quenched by the PQD. SQD not only acts to cause CDR but also provides quenching for the reaction mixture. In some embodiments, the coolant flows through the SQD at an adequate flow rate so that the construction material for the SQD is able to withstand the conditions of the reaction mixture. In embodiments, the flow rate of coolant in the SQD is adjusted to maintain the temperature of the reaction mixture within a desired range. This desired temperature range is lower than the temperature of reaction Zone 1, which is a primary reaction zone; it may be any temperature between the maximum achievable temperature and the temperature at which all reactions cease.

In some embodiments, the PQD and SQD are coordinated to provide variable quenching effects for the thermal reactor, which adjusts the composition of the products obtained. For example, reaction Zone 1 (a primary reaction zone) may be maintained at a first temperature range and reaction Zone 2 (a secondary reaction zone) may be maintained at a second temperature range, wherein the second temperature range is lower than the first. As a result, different thermal reactions may take place in Zone 1 and Zone 2, rendering different reaction products. The temperature ranges at which Zone 1 and Zone 2 are maintained are according to the desired product compositions for each specific operation. Variable operation parameters include type of coolant, temperature of coolant, flow rate of coolant for PQD or SQD or both, moving speed of SQD, moving pattern of SQD, spray duration, spray pattern, spray angle, and spray frequency. In certain cases, when the SQD functions sufficiently, the PQD does not need to provide any cooling/quenching (no flow into inlet 345 or flow rate of stream 340 being zero).

In some embodiments, prior to activating spray nozzle 390 for CDR and quenching, the coolant is circulated inside the SQD, including the axially adjustable pipe and spray nozzle. In embodiments, CDR and quenching utilizing the SQD take place simultaneously when the thermal reactor is in operation. In embodiments, the operation of the SQD is continuous and/or semi-continuous. In embodiments, the SQD is manually or automatically operated. In some embodiments, the movement of the SQD is programmed. In some embodiments, the SQD is removably fixed inside the reactor. In some cases, the SQD stays inside the reactor whether or not it is in operation. In some cases, the SQD is fixed inside the reactor only when it is to be operated.

In some embodiments, the time that the SQD is in operation is less than 50% of the time the thermal reactor is operated. In this disclosure, a thermal reactor being operated means that reactions are taking place in the reactor unless otherwise specified. In some embodiments, the time that the SQD is in operation is less than 10% of the time the thermal reactor is operated. In some embodiments, the time that the SQD is in operation is between 0.1% and 1% of the time the thermal reactor is operated. In some embodiments, the time that the SQD is in operation is between 0% and 100% of the time the PQD is operated. In some embodiments, the time that the SQD is in operation is between 50% and 100% of the time the PQD is operated. In some embodiments, the time that the SQD is in operation is more than 10% of the time the PQD is operated. In some embodiments, the SQD is operated before an operation of the thermal reactor starts. In some embodiments, the SQD is operated after an operation of the thermal reactor ends.

Coolant Recycle

In embodiments, the coolant with removed carbon deposits is collected and passed through a downstream separation means (such as centrifugation, filtration) to separate the carbon deposits from the coolant (not shown in FIGS. 1-3). In some embodiments, the separation system is operated at a pressure at which the coolant is a liquid. In some embodiments, the coolant is further passed through a cooling system to be recycled and reused in the PQD or SQD or both.

While the preferred embodiments of the invention have been shown and described, modifications thereof can be made by one skilled in the art without departing from the spirit and teachings of the invention. Process criteria, equipment, and the like for any given implementation of the invention will be readily ascertainable to one of skill in the art based upon the disclosure herein. Use of the term "optionally" with respect to any element of the invention is intended to mean that the subject element is required, or alternatively, is not required. Both alternatives are intended to be within the scope of the invention. The embodiments described herein are exemplary only and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference in the Background is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method to remove carbon deposits comprising
   (a) providing a reaction vessel having an inner wall, wherein said reaction vessel is configured to receive reactants and export products and byproducts;
   (b) reacting said reactants to form said products and byproducts, wherein said byproducts comprise carbon, at least a portion of which becomes deposited on the inner wall of said reaction vessel;
   (c) providing a primary quench device (PQD) configured to receive a fluid and disperse said fluid into said reaction vessel, wherein said PQD comprises an array of spray nozzles fixed on the inner wall of said reaction vessel at a first axial position with respect to the reaction vessel;
   (d) providing a secondary quench device (SQD) configured to receive a fluid and disperse said fluid into said reaction vessel, wherein said SQD comprises
       a pipe movable axially with respect to the reaction vessel, the pipe having a coolant entry end and a nozzle end, wherein said pipe is configured to be removably fixed inside said reaction vessel; and
       a spray nozzle that is fluidly connected to said pipe at its nozzle end via a fluid tight seal connection;
   (e) introducing a first coolant to the array of nozzles of said PQD at a first flow rate and dispersing said first coolant through said array of nozzles of said PQD to quench the reaction of said reactants in said reaction vessel;
   (f) introducing a second coolant to the pipe of said SQD at a second flow rate; and
   (g) dispersing the second coolant through the spray nozzle of said SQD onto the inner wall of said reaction vessel in an upstream direction with respect to the reaction to remove carbon deposits or to quench the reaction of said reactants or to accomplish both.

2. The method of claim 1, wherein steps (f) and (g) take place while the axially movable pipe of said SQD is moving inside the reaction vessel.

3. The method of claim 1, wherein steps (f) and (g) take place while step (b) is taking place in said reaction vessel.

4. The method of claim 1, wherein step (f) takes place at a sufficient second flow rate before the axially movable pipe moves upstream in the reaction vessel beyond the first axial position of said PQD.

5. The method of claim 1, wherein the first flow rate is regulated to maintain the temperature of a mixture of reactants in a desired range.

6. The method of claim 1, wherein during a movement of the movable pipe of said SQD, the first and second flow rates are regulated to maintain the temperature of a mixture of reactants in desired ranges.

7. The method of claim 1, wherein said first coolant or said second coolant is selected from the group consisting of water, oil, an inorganic solvent, an organic solvent, a solvent derived from hydrocarbons, and combinations thereof.

8. The method of claim 1, wherein the duration for steps (f) and (g) to be in operation is more than 10% of the duration for step (e) to be in operation.

9. The method of claim 1, wherein the duration for steps (f) and (g) to be in operation is less than 50% of the duration that step (b) is taking place in said reaction vessel.

10. The method of claim 1, wherein the duration for steps (f) and (g) to be in operation is less than 10% of the duration that step (b) is taking place in said reaction vessel.

11. The method of claim 1, wherein the duration for steps (f) and (g) to be in operation is between 0.1% and 1% of the duration that step (b) is taking place in said reaction vessel.

12. The method of claim 1 further comprising (h) collecting coolant with removed carbon deposits contained therein from said reaction vessel;

(i) separating said collected coolant from said removed carbon deposits;

(j) cooling the separated coolant to a desired temperature range; and (k) recycling the cooled coolant to be reused in step (e) or step (f) or both.

13. The method of claim 12, wherein said separating in step (i) comprises centrifugation and filtration.

* * * * *